June 8, 1926.
A. A. WYCKOFF
1,587,997
EXPANSIBLE ARMOR PLATE TIRE PROTECTOR
Filed Feb. 2, 1925
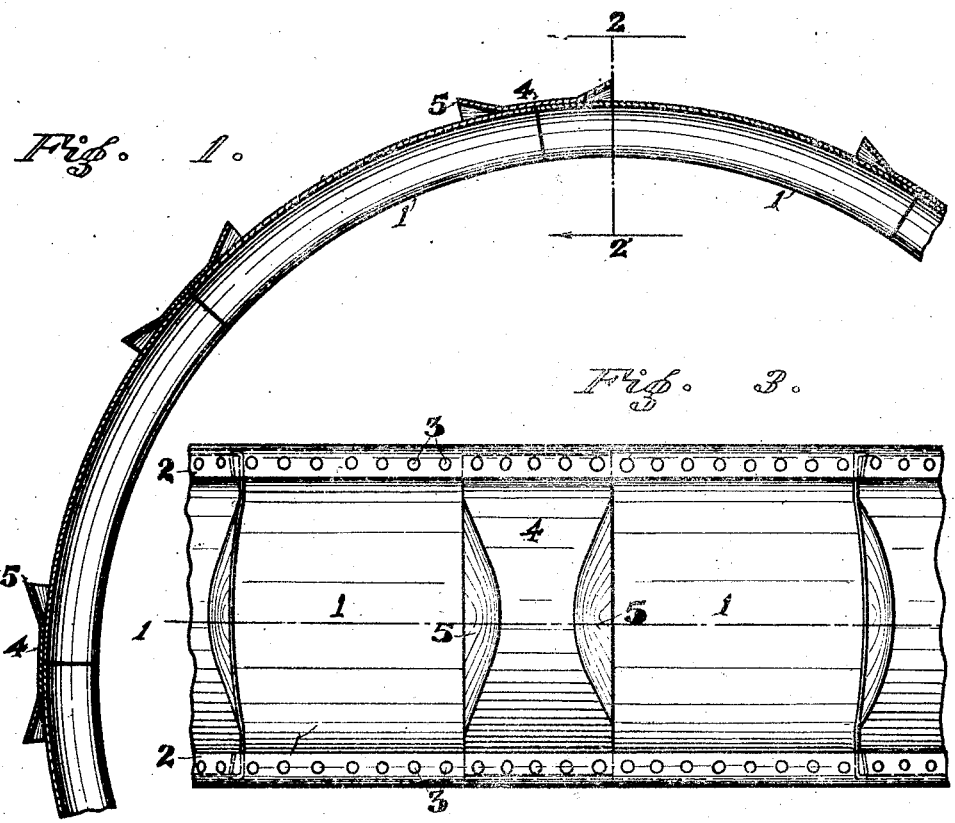
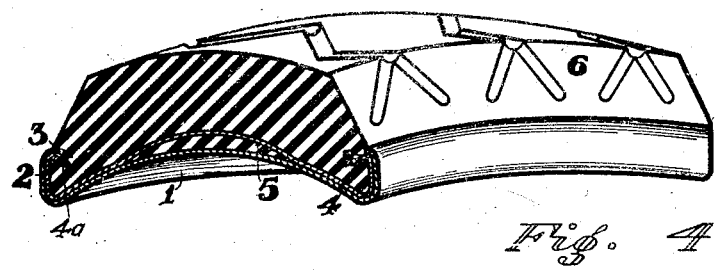
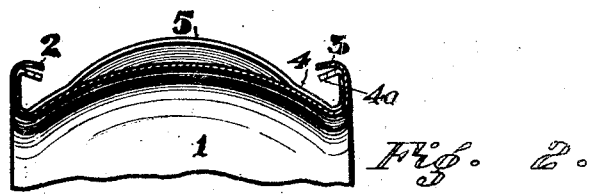
INVENTOR
Amos A. Wyckoff
BY
J. C. Frahuco
ATTORNEY Patented June 8, 1926.

1,587,997

UNITED STATES PATENT OFFICE.

AMOS A. WYCKOFF, OF OAKLAND, CALIFORNIA, ASSIGNOR TO WYCKOFF MANUFACTURING COMPANY, A CORPORATION OF CALIFORNIA.

EXPANSIBLE ARMOR-PLATE TIRE PROTECTOR.

Application filed February 2, 1925. Serial No. 6,231.

This invention relates to tire protectors of the type adapted to encircle and encase the tread of a pneumatic tire.

The tire protectors heretofore invented and used have not proven successful, principally because they were made in one section with no provision being made for the convenient substitution of worn parts. I have found that by making the metallic protector in sections so that the same is not rigid, the continued vibration of the automobile wheel will not cause the same to break. I have also found by providing a protector in which the metal part and the rubber tread are attached together by vulcanizing that a compact, noiseless and resilient means for protecting the pneumatic tire is afforded.

An object of this invention is to provide an expansible tire protector which is adapted to encircle and encase the tread of a pneumatic tire.

Another object of this invention is to provide an overtire having a metallic layer which will prevent puncture or wear of the tire.

Another object of this invention is to provide an expansible overtire, comprised of a plurality of overlapping sections to which is vulcanized a resilient rubber tread.

With these and other objects in view the invention consists in the novel construction and arrangement of parts hereinafter described, illustrated in the accompanying drawings, and particularly pointed out in the appended claim.

In the said drawings:—

Fig. 1 is a cross sectional view taken on the line 1—1' of Fig. 3, showing in section the metallic portion of the tire protector and the means for joining the various parts thereof together;

Fig. 2 is a cross sectional view taken on the line 2—2' of Fig. 1;

Fig. 3 is a plan view of the metallic portion of the tire protector; and

Fig. 4 is a perspective view of the tire protector showing the manner in which the same is constructed.

Referring to the drawings, the numeral 1 represents arc shaped metallic sections, the edges of which are turned up and are provided with inwardly projecting flanged portions 2. The flanged portions 2 are provided with a plurality of perforations 3 extending circumferentially around the same. The metal sections 1 may be of any desired length, and sufficient in number to encircle the tread of a pneumatic tire when placed together end to end. The joined ends of the sections 1 are held together by means of arc shaped strips 4, which are of approximately the same shape as the said sections; but slightly smaller in size so that they are permitted to fit closely within the outside surface of the sections. The strips 4 are provided with perforations in their inwardly projecting flanged portions 4$^a$, which are similar to the perforations 3, and when the sections 1 are joined with the strips 4 in place over the joints, the perforations in the flanged portions 4$^a$ of the said strips are located opposite to and adjacent the perforations 3 located in the flanged portions 2 of sections 1. The said strips 4 are provided at each of their ends near the central portions thereof with raised parts 5. The metallic band of the protector is assembled by sliding each of the strips 4 inside each of the sections 1, joining the ends of the sections together and forcing the strips over the joined ends of the sections so that the perforations 3 coincide with the perforations in the flanged portions of the strips. After the parts of the metallic band are thus assembled, it is placed in a suitable mold and a resilient rubber band 6 is vulcanized over the outer surface of the sections 1 and strips 4. As the rubber comprising the rubber band 6 is applied over the parts of the metallic band, some of it enters the spaces located between the raised parts 5 of the strips 4 and the sections 1, while near the outer edges of the sections and the strips the said rubber fills up the perforations therein and covers over the flanged portions 2. After the rubber comprising the rubber band 6 is thus applied, the parts of the metallic band are held firmly together, and are prevented from becoming separated by the rubber which is now located inside the perforations 3, over the flanged portions of the strips 4 and sections 1 and underneath and over the raised parts 5. Thereby a compact, inexpensive and noiseless protector is provided for pneumatic tires.

A tire protector constructed as described with a plurality of joined sections, is far more flexible than devices of a similar nature comprised of a continuous metallic band, for the reason that each one of the sections moves inwardly and outwardly upon the jar of the automobile wheel. The resilient rubber band 6 being vulcanized underneath the raised parts 5 of strips 4, and between the flanged portions 2 of section 1 and flanged portions 4ª of strips 4, produce resilient cushions which render the protector noiseless, resilient and flexible.

After the protector is placed upon the deflated pneumatic tire, the latter is inflated in the usual manner until the tread thereof presses firmly against the inside surface of the joined sections 1. The resilient rubber band 6 tends at all times to hold the various parts of the metallic band in their proper positions, thereby serving the combined purposes of providing a resilient tread, and a means for maintaining and holding the parts of the protector in place.

While the construction herein described, and illustrated in the accompanying drawings, in the preferred form of the device, it is obvious that various changes in the form, proportions, size and minor details of construction may be made without departing from the spirit or sacrificing any of the advantages of the invention. It is understood, however, that any changes in the form or construction of my improved expansible armor plate tire protector are to be limited by the scope of the appended claim.

Having described my invention, what I claim is:—

A tire protector comprising a plurality of arc shaped sections joined end to end into a circular band, a plurality of arc shaped strips fitting over the joined ends of the sections, having their lateral edges projecting downwardly from the lateral edges of the sections, a plurality of raised parts located in the ends of the strips adjacent the central parts thereof, and a rubber band extending over the joined sections and strips, having parts thereof located between the edges of the strips and sections and underneath the raised parts of the strips.

AMOS A. WYCKOFF.